R. S. BARTLETT.

Improvement in Fruit Baskets.

No. 122,984.

Patented Jan. 23, 1872.

Witnesses.
Chas. H. Wilson
Edmund Masson

Inventor.
Roland S. Bartlett,
By atty. A. B. Stoughton.

122,984

UNITED STATES PATENT OFFICE.

ROLAND S. BARTLETT, OF NORTHAMPTON, MASSACHUSETTS, ASSIGNOR TO WILLIAMS MANUFACTURING COMPANY, OF SAME PLACE.

IMPROVEMENT IN FRUIT-BASKETS.

Specification forming part of Letters Patent No. 122,984, dated January 23, 1872.

*To all whom it may concern:*

Be it known that I, ROLAND S. BARTLETT, of the town of Northampton, Hampshire county, Massachusetts, have invented a new and useful Improvement in Fruit-Baskets; and I do hereby declare that the following is a full and exact description thereof.

The nature of my invention consists in using strips for the sides which are wider at one end than the other, the difference in the width depending upon the amount of "flare" to be given to the basket and the size of the openings at the top and at the bottom, and the number of strips which are desired in a basket of a given size in circumference.

Having described the nature of my invention, I will now proceed to describe its construction with reference to the accompanying drawing.

Figure 1:
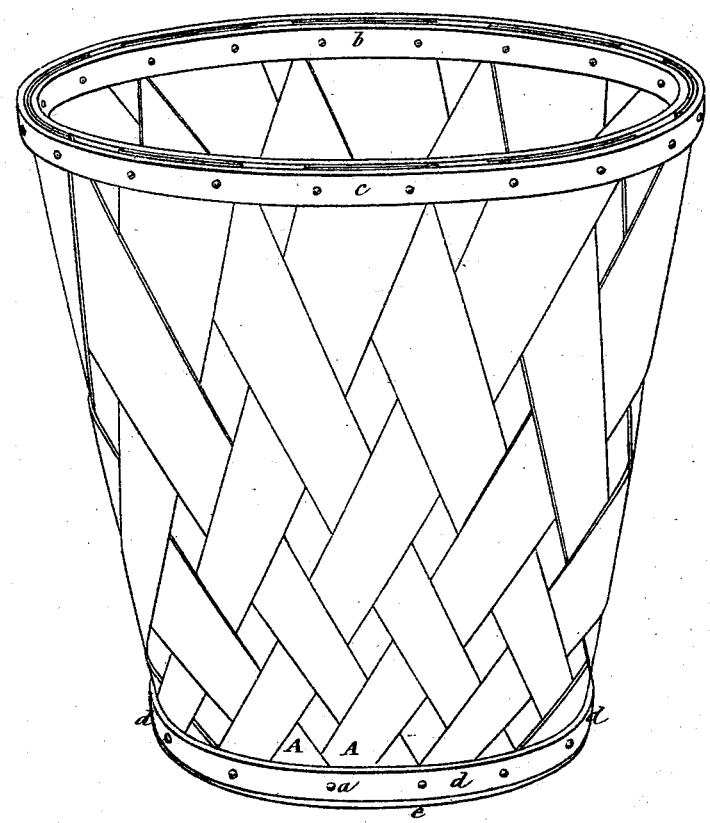
Figure 2:
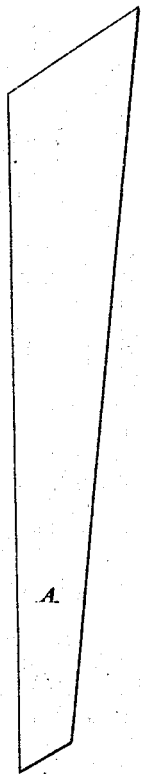
Figure 3:
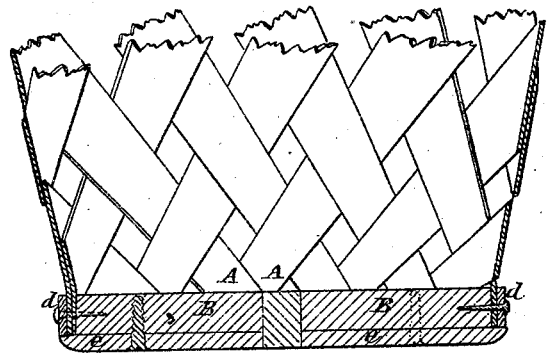

Figure 1 represents the basket when completed. Fig. 2 represents the strip used for the sides. Fig. 3 represents a section through the bottom of the basket.

After the strips A, which are from one-sixteenth of an inch to one-quarter of an inch in thickness, are prepared, two of them are nailed to the bottom board B, as at $a$, Fig. 1, one slanting to the right and one to the left of the point to which they are nailed; then two more are nailed in the same way at any distance from the others, and so on around the bottom board B. The strips are then braided into each other, as shown in Fig. 1, to the top of the basket. A hoop, $b$, is then put round these on the inside, and one, $c$, on the outside, and nailed together, the nails being driven through the strips. A hoop, $d$, is nailed round the bottom of the basket, as shown in Fig. 1; and the ends of the strips taken off to the edge of the hoop. A round board, $e$, may then be nailed onto the bottom board, large enough to extend over the ends of the strips and the hoop, to protect the bottom, if desired, as shown in Fig. 3.

For some purposes it may be better to have the openings in the sides smaller at the bottom than at the top, and for others it may be better to have them the same. My invention does not consist in the amount of taper given to the strips, and the comparative size of the openings resulting therefrom, but in tapering the strip a greater or less amount, according to the size of the openings desired.

What I claim as my invention is—

A basket, the strips A made and interlaced as shown, and united at their lower ends and secured by the bottom B $e$ and hoop $d$, and at their upper ends by the hoops $b$ $c$, as herein described and represented.

ROLAND S. BARTLETT.

Witnesses:
D. W. BOND,
H. H. BOND.